United States Patent
Alhof

(10) Patent No.: US 9,776,479 B2
(45) Date of Patent: Oct. 3, 2017

(54) VEHICLE DOOR HAVING A GLASS CHANNEL WITH SEPARATE BRACKET

(71) Applicant: GM GLOBAL TECHNOLOGY OPERATIONS LLC, Detroit, MI (US)

(72) Inventor: Michael Alhof, Flörsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/974,183

(22) Filed: Dec. 18, 2015

(65) Prior Publication Data

US 2016/0176269 A1 Jun. 23, 2016

(30) Foreign Application Priority Data

Dec. 20, 2014 (DE) .................. 10 2014 019 302

(51) Int. Cl.
 *B60J 5/04* (2006.01)
(52) U.S. Cl.
 CPC ............. *B60J 5/0402* (2013.01); *B60J 5/042* (2013.01); *B60J 5/0408* (2013.01)
(58) Field of Classification Search
 CPC ......... B60J 5/0402; B60J 5/042; B60J 5/0408
 USPC ............... 49/502; 296/146.2, 146.5
 See application file for complete search history.

(56) References Cited

U.S. PATENT DOCUMENTS

| | | | |
|---|---|---|---|
| 3,732,276 A | 5/1973 | Van Eygen, et al. | |
| 5,139,307 A * | 8/1992 | Koops | B60J 10/78 296/201 |
| 6,481,162 B2 | 11/2002 | Lim | |
| 8,042,859 B2 * | 10/2011 | Kimoto | B60J 5/0405 296/146.1 |
| 8,151,520 B2 | 4/2012 | Yamashita et al. | |
| 8,209,910 B2 * | 7/2012 | Eckart | B60J 1/10 296/146.2 |
| 2007/0084130 A1 * | 4/2007 | Gaustad | B60J 1/17 49/502 |
| 2007/0262607 A1 * | 11/2007 | Saito | B60J 5/0402 296/146.2 |
| 2014/0035314 A1 * | 2/2014 | Jendrossek | B60J 10/041 296/146.2 |
| 2015/0008697 A1 * | 1/2015 | Inai | B60R 1/006 296/146.6 |

(Continued)

FOREIGN PATENT DOCUMENTS

DE 3228707 A1 2/1984
DE 102005016455 A1 10/2006

(Continued)

OTHER PUBLICATIONS

German Patent Office, German Search Report for German Application No. 102014019302.0, dated Aug. 4, 2015.

(Continued)

*Primary Examiner* — Jerry Redman
(74) *Attorney, Agent, or Firm* — Lorenz & Kopf LLP

(57) ABSTRACT

A vehicle door includes a window area and a hollow door body underneath the window area. A web divides the window area into a front and rear window, and extends into the door body. At least one of the windows has a movable pane, one edge of which engages into a groove of the web. A web holder is anchored on a wall of the door body, and plug connected with a lower end of the web in the longitudinal direction of the web.

13 Claims, 4 Drawing Sheets

(56) References Cited

U.S. PATENT DOCUMENTS

| | | | |
|---|---|---|---|
| 2015/0015023 A1* | 1/2015 | Costigan | B60J 5/0468 296/146.2 |
| 2015/0048646 A1* | 2/2015 | Yokota | B60J 5/0408 296/146.2 |
| 2015/0108785 A1* | 4/2015 | Yokota | B60J 5/0408 296/146.5 |
| 2015/0165881 A1* | 6/2015 | Bang | B60J 5/0418 296/146.2 |
| 2015/0246597 A1* | 9/2015 | Koike | B60J 5/0402 49/459 |
| 2015/0251524 A1* | 9/2015 | Goto | B60J 5/0426 52/204.71 |

FOREIGN PATENT DOCUMENTS

| | | |
|---|---|---|
| EP | 0378419 A1 | 7/1990 |
| EP | 1712385 A2 | 10/2006 |
| GB | 424155 A | 2/1935 |
| GB | 1098723 A | 1/1968 |
| JP | 03243416 A * | 10/1991 |
| JP | 04257730 A * | 9/1992 |
| JP | 2011025761 A | 2/2011 |

OTHER PUBLICATIONS

Great Britain Patent Office, Great Britain Search Report for Great Britain Application No. 1520182.5, dated Mar. 29, 2016.

* cited by examiner

VEHICLE DOOR HAVING A GLASS CHANNEL WITH SEPARATE BRACKET

CROSS-REFERENCE TO RELATED APPLICATION

This application claims priority to German Patent Application No. 102014019302.0, filed Dec. 20, 2014, which is incorporated herein by reference in its entirety.

TECHNICAL FIELD

The present disclosure pertains to a door, in particular for a motor vehicle, and more particularly to a door structure having a web that divides the window area into a front and rear window and extends into the door body.

BACKGROUND

Vehicle doors normally encompass a window area with a window pane above a waistline, which can be moved vertically, and a hollow door body below the waistline, into which the movable window pane can be lowered. EP 1 106 408 A1 discloses such a vehicle door, in which a web that guides the vertical movement of the pane divides the window area into a front and rear window above the waistline and extends over the waistline and into the door body. The web encompasses an elongated profile with an H-shaped cross section. The panes of the front and rear window engage into the two grooves therein, along with a bracket, which protrudes from the profile in proximity to its lower end, and is used for attachment to a wall of the door body. The bracket complicates the manufacture of the web, since it must either be joined to the H-profile after the fact, or, when molded as a single part with the latter, necessitates complicated molding tools.

SUMMARY

In accordance with the present disclosure a vehicle door with a movably guided pane is disclosed that can be easily and cost-effectively assembled. According to one embodiment of the present disclosure, a vehicle door includes a window area and a hollow door body underneath the window area. A web divides the window area into a front and rear window and extends into the door body. At least one of the windows has a movable pane, one edge of which engages into a groove of the web. A web holder is anchored to a wall of the door body and plug-connected with a lower end of the web in the longitudinal direction of the web.

During the assembly of the door, such a structural design makes it possible, for example, to first mount the web holder to the door body, then manufacture the plug connection, and finally join the upper end of the web with the vehicle door as well, or conversely insert the web into the door body from above, and subsequently plug the web holder onto the end of the web from below, and finally secure the web holder to the door body. The time expended to manufacture the plug connection at the lower end of the web is minimal. Manufacturing tolerances, in particular for the length of the web, can be balanced out, even if the position of its upper end potentially visible on the finished door is prescribed without any tolerance, by providing a clearance in the longitudinal direction of the web between the web and web holder, or by having the position of the web holder on the door body be variable in the longitudinal direction, e.g., by means of an oblong hole.

The plug connection can take the form of a recess in the web holder that accommodates the lower end of the web. A wall of this recess can exhibit a slit that overlaps the groove of the web, so that the windowpane can be lowered right down to the lower end of the web. Conversely, the web holder can also encompass a journal, which engages into a recess of the web extending in the longitudinal direction. In the simplest case, this recess is identical to the groove into which the movable pane engages.

Also conceivable is a combination of the aforementioned features in which the web holder exhibits both a recess for accommodating the lower end of the web, as well as a journal in the recess that engages into the recess of the web. The web holder can for its part exhibit a groove that lengthens the groove of the web; in this way, the lower edge of the windowpane can be lowered until just under the web holder.

The web holder can be a molded part included of a plastic. Since its dimensions are generally small by comparison to the web, the web holder can be cost-effectively realized via injection molding. Because the web and web holder are separated, the web can be designed with a uniform cross section over its entire length. For this reason, the web can be inexpensively realized with a continuous casting technique, such as extrusion, roll forming or a combination of several continuous casting techniques.

In order to fasten the web holder to the wall of the door body, the web holder can exhibit a wall facing the wall of the door body and a clamp plugged onto the wall. A threaded sleeve of the clamp aligns flush with an orifice in the wall. While a thread can be precut in the threaded sleeve, the thread can also be cut only by screwing a screw that fixes the web holder to the well into the sleeve.

In order to form a seal along the edges of the pane and simultaneously accommodate the pane in the groove with a certain tolerance in the direction of its surface normal, at least one flexible lip can be arranged at an entry of the groove, and deflected by the edge of the pane engaging into the groove. Two flexible lips are preferably provided, which abut against respectively opposite sides of the pane.

The web can encompass an extrusion profile, which preferably extends over the entire length of the web. The web preferably encompasses a jacketed reinforcing insert. In particular, this reinforcing insert makes it possible to impart the required stiffness to the web as a whole, while the lips can at the same time easily yield to the pressure of the pane that is moved up and down between them. Therefore, the flexible lips are preferably designed as a single piece with an extruded layer that jackets the reinforcing insert. The web can exhibit a second groove, which incorporates an edge of a pane of the other window of the door.

Alternatively, the web can be guided between the windows in a rail, whose side facing away from the web exhibits a groove, which incorporates an edge of a pane of the other window.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
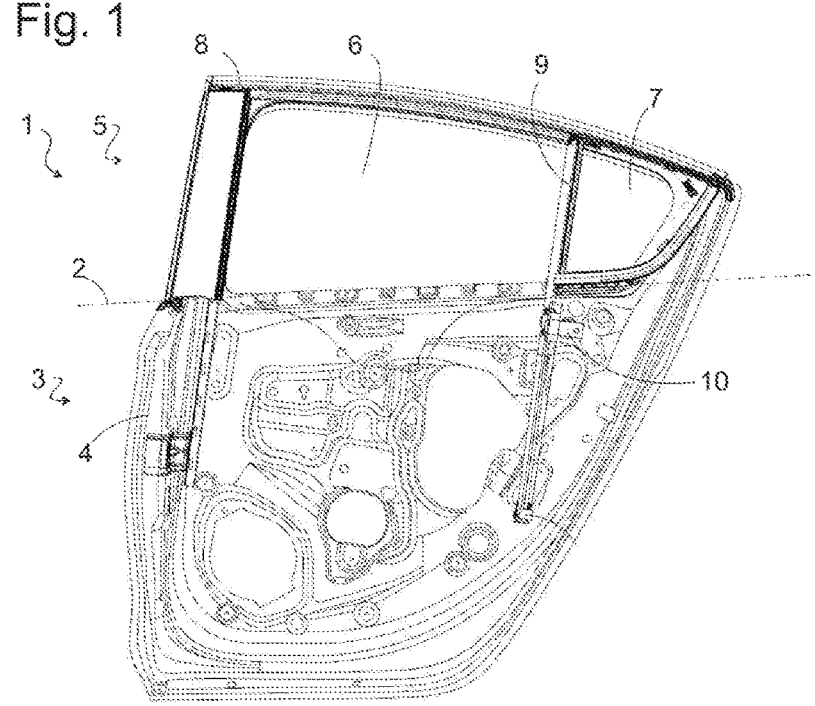
FIG. 1 is a view of a vehicle door, in which the outer wall of the door body has been removed so as to illustrate the interior of a hollow space between the outer and inner wall of the door body.

FIG. 1 shows a door 1 for a motor vehicle according to the present disclosure. The door 1 conventionally encompasses a door body 3 under a waistline 2, which is composed of an outer wall (not shown), an inner wall 4 and a door panel (not shown) on the side of the inner wall 4 facing away from the viewer. A window area 5 encompasses a front pane 6 and a rear pane 7, a window frame 8 enveloping the panes 6, 7 as well as a web 9, in which a rear edge of the pane 6 is guided in a vertically movable manner. An upper end of the web 9 is secured to the window frame 8. The web 9 extends downward over the waistline 2 and into the door body 3, and is fixed just below the waistline 2 by a clamp 10 and by a web holder 11 at its lower end to the inner wall 4.

The web holder 11 is an injection molded part included of a plastic. In a first embodiment shown in FIG. 2, the web holder 11 is roughly rectangular in shape, with two mutually parallel longitudinal walls 12, end walls 13, 14, an intermediate wall 15 parallel to the end walls 13, 14, and a floor plate 16, which extends to half the height of the walls 12-15 between the end wall 13 and intermediate wall 15. A sheet steel clamp 17 with a hairpin shaped cross section is plugged onto the intermediate wall 13.

Figure 3:
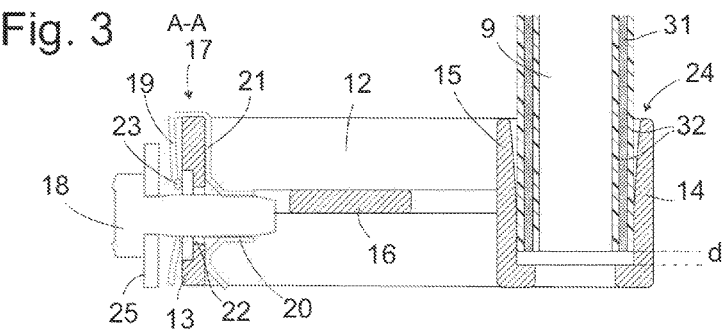
FIG. 3 is a longitudinal section through the web holder and web from FIG. 2 through line A-A.

The web holder 11 is provided so as to be secured to the inner wall 4 in any suitable manner, here by means of a screw 18, which sequentially penetrates openings in an inner wall 4 (not shown in FIG. 3, to be clamped between a flat washer 25 and the clamp 17), a leg 19 of the clamp 17 facing the inner wall 4, as well as the end wall 13, and engages into a thread formed in a sleeve 20 of a leg 21 of the clamp 17 that engages into the web holder 11. One of these openings can be an oblong hole elongated in the direction of the web 9, so that the position of the web holder 11 can be adjusted based on a length of the web 9 that potentially varies due to manufacturing tolerances.

Prior to inserting the screw 18, the clamp 17 could be frictionally held against the wall 13 by clamping the wall between the legs 19, 21. In the case shown in FIG. 3, the opening 22 of the wall 13 is expanded on its exterior side, so as to enable a positive anchoring by having a projection 23 of the clamp 17 engage into the opening 22.

The end wall 14 and intermediate wall 15 along with the longitudinal walls 12 border a recess 24 open toward the top, into which the lower end of the web 9 is inserted. In this way, the web 9 is fixed orthogonally to its longitudinal direction; it remains somewhat movable in the longitudinal direction, so that manufacturing tolerances can be balanced out by a variable distance d between the floor of the recess 2 and the lower end of the web 9.

Figure 4:
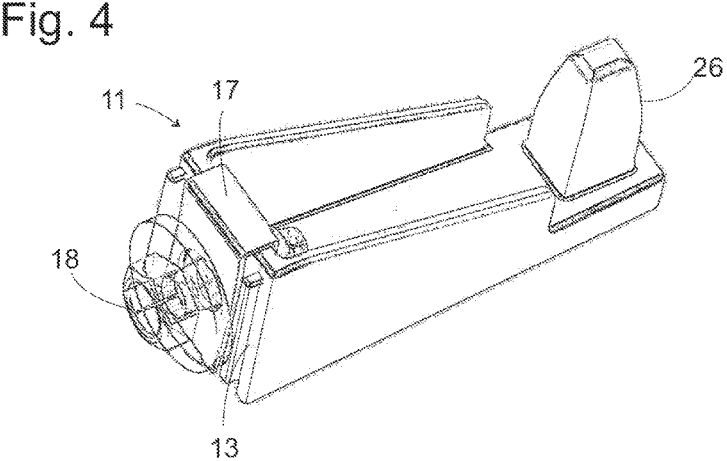
FIG. 4 is a perspective view of a web holder according to a second embodiment of the present disclosure.

FIG. 4 shows a perspective view of the web holder 11 according to a second embodiment. The recess 22 is here replaced by a journal 26 that perpendicularly protrudes from the floor plate 16, and is provided to engage into the web 9 through its open lower end. The clamp 17 plugged onto the end wall 13 is identical to the one depicted in FIGS. 2 and 3, as also visible in FIG. 5. Here as well, a plug connection between the web holder 11 and web 9 can be quickly and easily realized.

Figure 5:
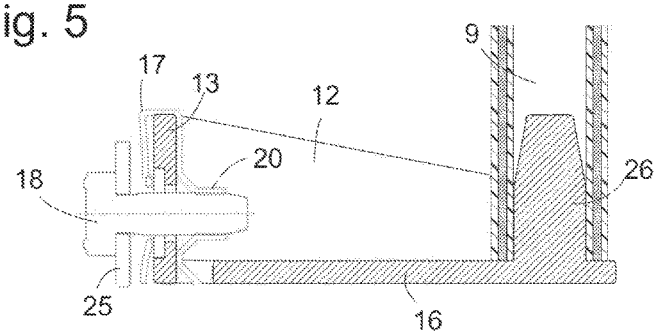
FIG. 5 is a longitudinal section through the web holder from FIG. 4 and a web plug connected with the web holder.
Figure 6:
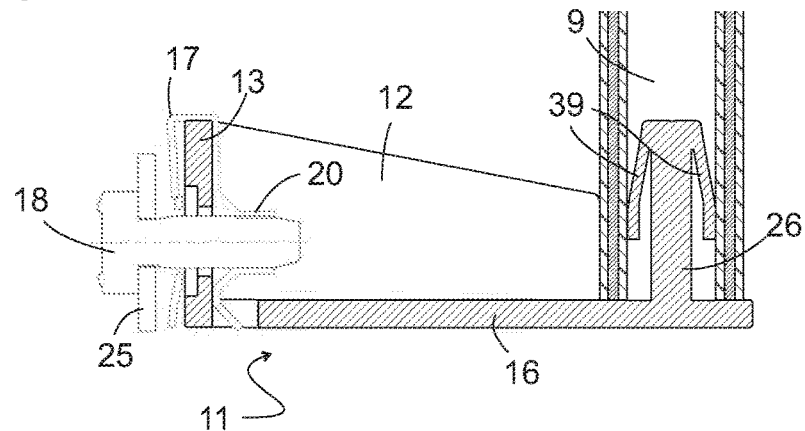
FIG. 6 is a variant of the web holder from FIG. 4.

FIG. 6 shows a variant of the web holder 11 from FIG. 4 or FIG. 5. The journal 26 here bears two laterally protruding leaf springs 39, which are slightly pressed against each other when plugging on the web 9, and thereby frictionally hold the end of the web 9 free of play.

Figure 2:
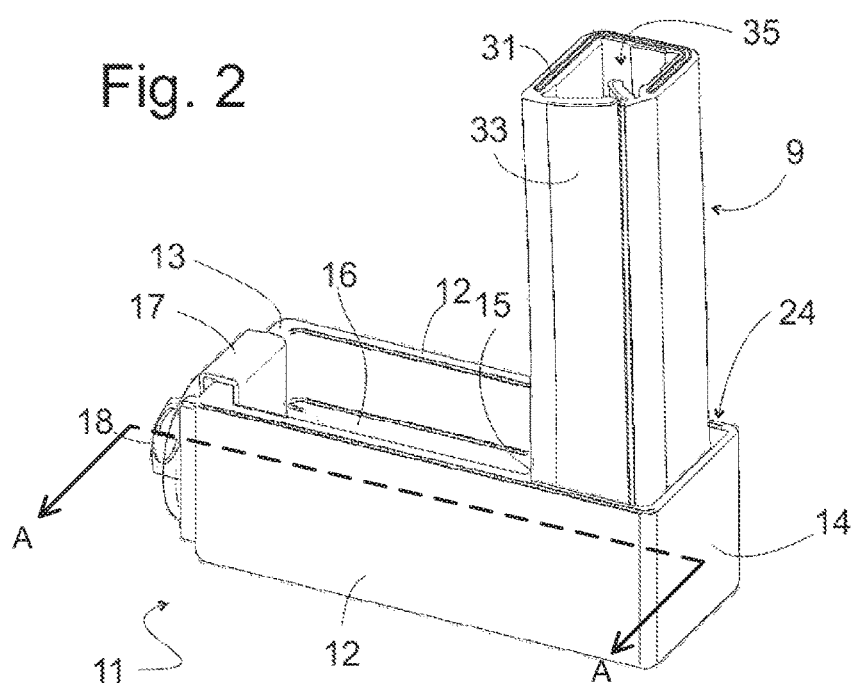
FIG. 2 is a perspective view of a web holder and part of a web held thereon according to a first embodiment of the present disclosure.
Figure 7:
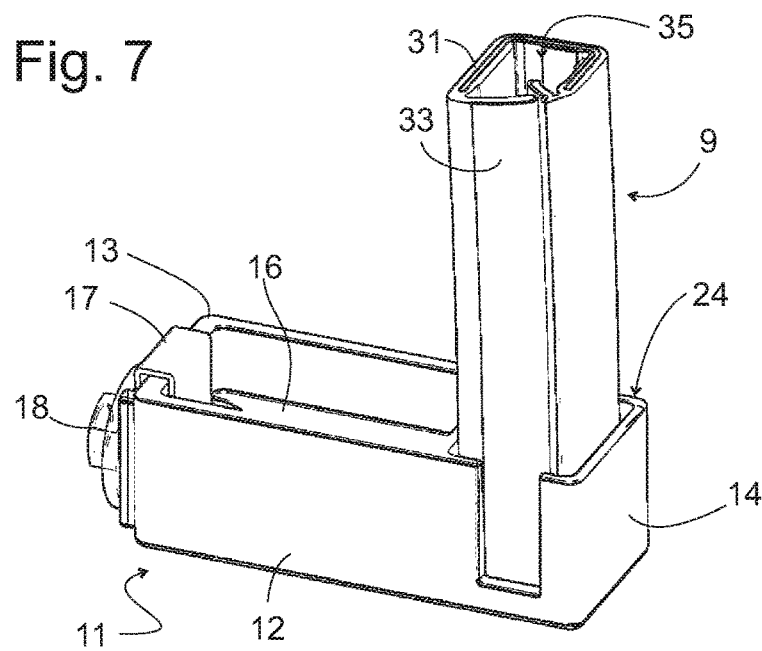
FIG. 7 is a variant of the web holder from FIG. 2.

The variant of the web holder 11 shown in FIG. 7 differs from the one in FIG. 2 by a slit 40, which overlaps with the groove 35 of the web 9 in such a way that the pane 6, when lowered as far as the lower end of the web 9, also engages into the slit 40.

Figure 8:
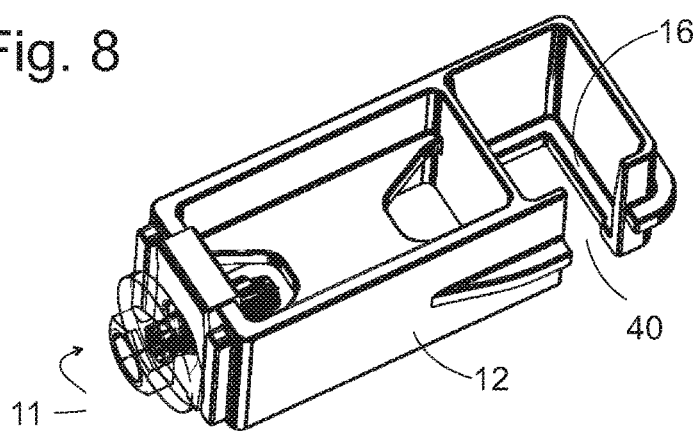
FIG. 8 is a further development of the web holder from FIG. 7.

In the variant in FIG. 7, the floor plate 16 is drawn through at the lower end of the slit 40, and forms a stop for the lower edge of the pane 6. In the further development depicted in FIG. 8, the floor plate 16 elongates the groove 35 with its own groove 41, which allows the pane 6 to lower beyond the web holder 11. The web 9 can here be shorter than in the other embodiments, since it does not have to guide the movement of the pane 6 over its entire length.

Figure 9:
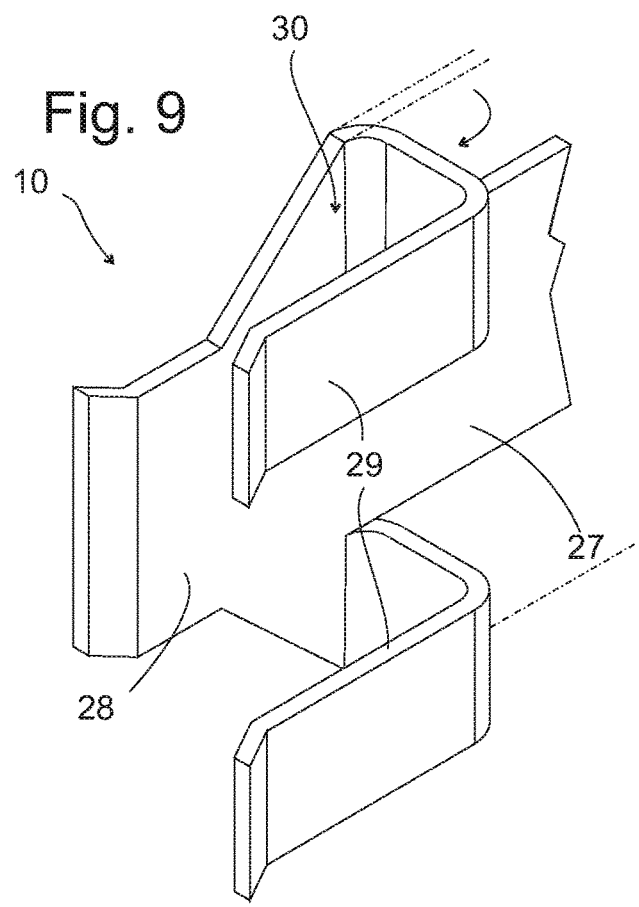
FIG. 9 is a partial view of a retaining clamp.

FIG. 9 shows the clamp 10 in a perspective partial view. The clamp 10 is cut out of sheet metal as a single piece and molded. A base plate 27 of the chamber 10 is fastened to the inner wall 4 in a rear area not completely depicted in FIG. 6 in a manner not shown, via bolting, welding or the like. A middle finger 28 of the clamp 10 extends toward the front in the plane of the base plate 27; two outer fingers 29 are freely cut out of the sheet metal on either side of the base plate 24 and bent toward the front, and together with the middle finger 25 border a groove 30 in which the web 9 is fixed by clamping.

Figure 10:
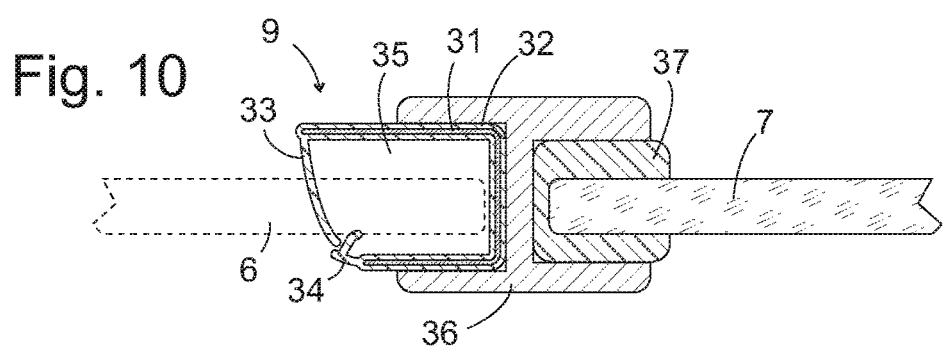
FIG. 10 is a section through the web at the height of the window area of the door from FIG. 1.

FIG. 10 shows the web 9 in cross section at the height of the window area 5. A reinforcing insert 31 of the web 9 having a U-shaped cross section is extruded out of a rigid plastic or roll formed out of a sheet metal strip. The reinforcing insert 31 is jacketed with a rubber layer 32 via co-extrusion. In the relieved state, lips 33, 34 co-extruded with the rubber layer 32 as a single piece seal the inlet of a groove 35, in which an edge of the pane 6 can vertically move as the lips 33, 34 are deflected.

Figure 11:
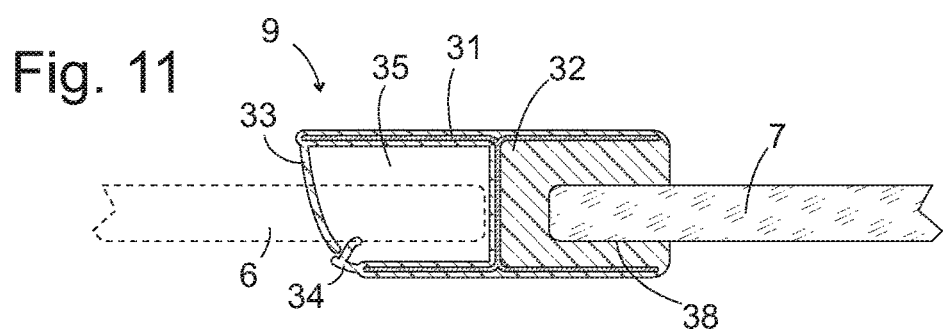
FIG. 11 is a section similar to FIG. 10 according to a third embodiment.

For its part, the web 9 is here accommodated in a groove of an H-shaped profile, which extends between the two panes 6, 7, and in whose second groove the pane 7 is clamped by a gasket 37. The profile 36 is omitted in the embodiment in FIG. 11, with the reinforcing insert 31 having an H-shaped cross section instead, so that the web 9 itself forms not just the groove 35 that guides the pane 6 as it moves, but also a groove 38 in which the pane 7 is rigidly clamped by the rubber layer 32 enveloping the entire reinforcing system 8.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A vehicle door comprising:
   a hollow door body underneath a window area;
   a web extending from the hollow door body into the window area such that the window area is divided into a first window region and a second window region, the web having a first and second groove formed in each of the first and second window regions;
   a web holder anchored to a wall of the door body and plug-connected with a lower end of the web; and
   a window assembly including a first pane for the first window region and a second pane for the second window region, wherein at least one of the first and second panes has an edge which engages the first and second groove formed in the web and is movable with respect to the window area.

2. The vehicle door according to claim 1, wherein the web holder comprises a recess accommodating a lower end of the web.

3. The vehicle door according to claim 2, wherein a wall of the recess has a slit formed therein which that overlaps the groove of the web.

4. The vehicle door according to claim 1, wherein the web further comprises a recess, and the web holder comprises a journal that is received in the recess and engages the web.

5. The vehicle door according to claim 1, wherein the web holder comprises a groove that extends the groove of the web.

6. The vehicle door according to claim 1, wherein the web holder comprises a plastic molded part.

7. The vehicle door according to claim 1, wherein the web holder comprises an end wall facing the wall of the door body and a clamp plugged onto the wall, the clamp having a threaded sleeve which aligns flush with an opening formed in the end wall.

8. The vehicle door according to claim 1, wherein the web further comprises at least one flexible lip arranged at an entry of the groove, wherein the flexible lip is configured to be deflected by the edge of the pane.

9. The vehicle door according to claim 1, wherein the web comprises an extrusion profile.

10. The vehicle door according to claim 1, wherein the web comprises a jacketed reinforcing insert.

11. The vehicle door according to claim 10, wherein the reinforcing insert is jacketed by an extruded layer that forms at least one flexible lip arranged at an entry of the first groove and the second groove, wherein the flexible lip is configured to be deflected by the edge of the at least one of the first and second panes.

12. The vehicle door according to claim 1, wherein the web has the first groove and the second groove opposite the first groove, wherein the first groove receives the edge of the first pane and the second groove receives an edge of the second pane.

13. The vehicle door according to claim 1, wherein one of the first groove or the second groove of the web engages the edge of the first pane, wherein the web is guided between the first and second panes in a rail, and wherein a side of the rail facing away from the web comprise the other of the first or second groove that receives the edge of the second pane.

* * * * *